United States Patent [19]
Dahlke et al.

[11] Patent Number: 6,154,526
[45] Date of Patent: Nov. 28, 2000

[54] DATA ACQUISITION AND ERROR CORRECTING SPEECH RECOGNITION SYSTEM

[75] Inventors: Karl Dahlke, Troy; Jay Braman, West Bloomfield, both of Mich.; Elizabeth Buechner, Atlanta, Ga.; Torre Meeder, West Bloomfield, Mich.; Tim Grost, Atlanta, Ga.

[73] Assignee: Intellivoice Communications, Inc., Atlanta, Ga.

[21] Appl. No.: 08/984,237

[22] Filed: Dec. 3, 1997

(Under 37 CFR 1.47)

Related U.S. Application Data

[60] Provisional application No. 60/032,177, Dec. 4, 1996.

[51] Int. Cl.[7] .................................................. H04M 3/44
[52] U.S. Cl. ....................... 379/88.03; 455/563; 704/275
[58] Field of Search ............................. 379/88.01, 88.02, 379/88.03, 88.04, 210, 213; 455/563, 412, 413, 414; 704/270, 275, 244, 239, 231

[56] References Cited

U.S. PATENT DOCUMENTS

| | | | |
|---|---|---|---|
| 4,599,693 | 7/1986 | Denenberg | 364/513 |
| 4,731,811 | 3/1988 | Dubus | 379/58 |
| 4,737,976 | 4/1988 | Borth et al. | 379/58 |
| 4,853,953 | 8/1989 | Fujisaki | 379/88 |
| 4,875,230 | 10/1989 | Blair | 379/63 |
| 5,054,053 | 10/1991 | Sakanishi | 379/63 |
| 5,291,543 | 3/1994 | Freese | 379/59 |
| 5,297,183 | 3/1994 | Bareis et al. | 379/59 |
| 5,509,049 | 4/1996 | Peterson | 379/58 |
| 5,917,891 | 6/1999 | Will | 379/88.03 |

OTHER PUBLICATIONS

Mulls, A PABX That Listens and Talks, Speech Technology Jan./Feb. 1984, pp. 74–79.
Moosemiller, AT'T's Conversant I Voice System, Speech Technology, Mar./Apr. 1986, pp. 88–93.
Schalk, Voice Recognition Cellular Mobile Telephones, Speech Technology, Sep./Oct. 1986, pp. 24–28.
Uniden, Inc., Voice Dial Operating Guide, 1989.
Conway, et al., Voice Recognition at the Cellular Switch, Mar. 1993.

Primary Examiner—Scott L. Weaver
Attorney, Agent, or Firm—James L. Ewing, IV; Nora M. Tocups; Kilpatrick Stockton LLP

[57] ABSTRACT

The present invention provides a data acquisition and error correcting speech recognition system especially adapted for use in mobile telecommunications switching offices. The system comprises speech recognized dialing information with historical user calling information and attempts to determine whether the dialing information has been misspoken or misrecognized. If a mistake appears likely, the system suggests corrected dialing information to the user. The system also maintains data on the likelihood of various components of dialing information being misrecognized and updates this information with each call. The historical calling information indicates the user's propensity to call within particular area codes and office codes, to call particular phone numbers, and to call at particular times of day.

27 Claims, 7 Drawing Sheets

TABLE LISTINGS FOR . . .
DATA VERSION 1.0
NUMBER OF ENTRIES IS 3.

NUMBERS LIST

| NUMBER | TIMES CALLED | LAST TIME CALLED |
|---|---|---|
| 5551212 | 1 | FRI AUG 16 07:54:35 1996 |
| 3134595899 | 1 | FRI OCT 04 04:07:56 1996 |
| 4795481314 | 1 | FRI OCT 04 09:21:21 1996 |

PROBABILITY TABLES

| OUTPUT DIGITS \ INPUT DIGITS | 0 | 1 | 2 | 3 | 4 | 5 | 6 | 7 | 8 | 9 |
|---|---|---|---|---|---|---|---|---|---|---|
| 0 | 90 | 10 | 10 | 5 | 5 | 20 | 5 | 10 | 10 | 15 |
| 1 | 5 | 92 | 5 | 5 | 10 | 10 | 5 | 15 | 5 | 20 |
| 2 | 5 | 5 | 92 | 5 | 5 | 5 | 5 | 5 | 5 | 5 |
| 3 | 5 | 5 | 20 | 90 | 5 | 5 | 5 | 5 | 10 | 10 |
| 4 | 10 | 5 | 5 | 5 | 90 | 10 | 5 | 5 | 5 | 5 |
| 5 | 10 | 5 | 5 | 5 | 5 | 93 | 5 | 5 | 5 | 10 |
| 6 | 5 | 5 | 5 | 5 | 5 | 5 | 90 | 5 | 5 | 5 |
| 7 | 5 | 5 | 5 | 5 | 5 | 5 | 5 | 90 | 5 | 5 |
| 8 | 5 | 5 | 10 | 15 | 5 | 5 | 20 | 5 | 90 | 5 |
| 9 | 5 | 5 | 5 | 5 | 5 | 10 | 5 | 5 | 5 | 90 |

DIGIT COUNTS

| 0 | 1 | 2 | 3 | 4 | 5 | 6 | 7 | 8 | 9 |
|---|---|---|---|---|---|---|---|---|---|
| 180 | 172 | 137 | 160 | 145 | 148 | 135 | 135 | 165 | 140 |

KEY WORDS LIST

| KEY WORD | NUMBER | TIMES OF DAY CALLED | | | |
|---|---|---|---|---|---|
| | | 0601-1100 | 1101-1700 | 1701-2200 | 2201-0600 |
| HOME | 313-555-1212 | 1 | 2 | 10 | 0 |
| OFFICE | 810-555-1212 | 4 | 5 | 4 | 0 |
| MAIL | 810-555-1205 | 1 | 4 | 5 | 0 |

| | PROBABILITY CORRECT | MOST LIKELY ERROR-1 | MOST LIKELY ERROR-2 | MOST LIKELY ERROR-3 |
|---|---|---|---|---|
| HOME | 92 | MAIL, 5 | OFFICE, 1 | 0 |
| OFFICE | 95 | HOME, 1 | 0 | 0 |
| MAIL | 90 | HOME, 8 | OFFICE, 2 | 0 |

DATA ACQUISITION AND ERROR CORRECTING SPEECH RECOGNITION SYSTEM

This application claims the benefit of prior U.S. provisional application Serial No. 60/032,177 filed Dec. 4, 1996.

TECHNICAL FIELD

This invention is related to telecommunications systems, and more particularly to an electronic digital signal processor-controlled telecommunications system for the recognition of spoken commands and for the directing of telephone calls based on spoken commands with data acquisition and error correction capabilities.

BACKGROUND OF THE INVENTION

It is well-known that many of the safety hazards of cellular telephone use could be alleviated by utilizing automatic speech recognition. While telephone-based speech recognition systems are known, cellular voice dialing over a mobile telephone exchange ("MTX") presents significant challenges for two basic reasons. First, the recognition technology must accommodate a tremendous range of both remotely-mounted and hand held microphone types. Second, the signal may be band-limited and degraded in transmission to the MTX where the recognition system will be located. Most voice controlled dialers in the prior art, have been unsuccessful in achieving a sufficient accuracy in recognizing phone numbers spoken in the cellular environment for good user satisfaction.

There is therefore a need for voice recognition systems for use in the cellular network environment that facilitate the use of voice-dialing by providing good error correction features.

BRIEF SUMMARY OF THE INVENTION

It is therefore an object of the present invention to describe an implementation of an error correcting speech recognition system in a cellular or personal communications network environment.

It is further object of the invention to describe an error correcting speech recognition system for use at a mobile telephone exchange of a cellular or personal communications network. The placement of the speech recognition system at the MTX significantly reduces cost and increases reliability by enabling the switch vendor to install and maintain the system in conjunction with the cellular switch.

It is a further object of the invention to acquire user calling data for processing and identifying user calling tendencies.

These and other objects of the invention are provided in an advanced system for the recognizing of spoken commands over the cellular telephone or any personal communications (i.e., any non-wireline) network. In the cellular application, for example, the error correcting speech recognition system interconnects either internally with or as an external peripheral to a cellular telecommunications MTX switch. In the cellular environment, the error correcting speech recognition system will include an administrative subsystem, a call processing subsystem, a speaker-dependent recognition subsystem, a speaker-independent recognition subsystem, and a data storage subsystem.

The error correcting speech recognition system also allows for increased efficiency in the cellular telephone network by integrating with the switch or switches as a shared resource. The administrative subsystem of the speech recognition system is used to keep statistical logs of pertinent call information. Pre-recorded instructional messages are stored in the memory of the call processing subsystem for instructing a user on his or her progress in using the system. The speaker-independent recognition subsystem allows the user to interact with the system employing non-user specific functions. User specific functions are controlled with the speaker-dependent recognition subsystem. User specific attributes collected by the recognition subsystems are stored in the data storage subsystem.

The foregoing has outlined some of the more pertinent objects of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be hand by referring to the following detailed description of the preferred embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION

Figure 1:
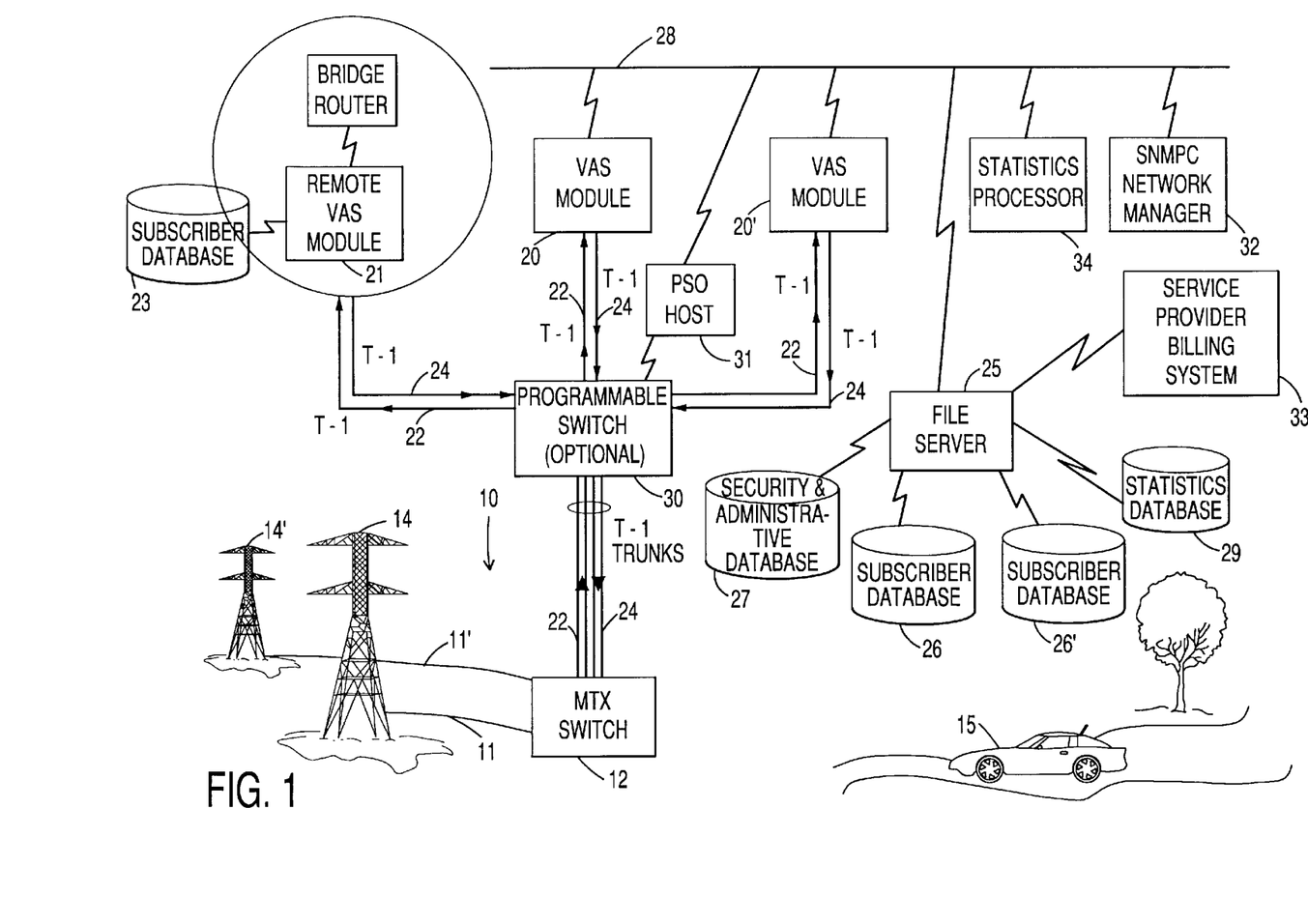
FIG. 1 is a diagram of a representative cellular telephone network incorporating an external switch-based error correcting speech recognition system according to the present invention.

FIG. 1 is a diagram of a cellular telephone network incorporating an external switch-based error correcting speech recognition system according to the present invention. Although the following description is specifically related to use of the data acquisition and error correcting speech recognition system at or in conjunction with an MTX of a cellular network, it should be appreciated that the system also interconnects either internally with or as an external peripheral to a personal communications network. Indeed, the principles of the invention are applicable to any cellular-like network application, i.e., where a non-wireline communications network is employed for mobile satellite, portable or personal communications. The data acquisition and error correcting speech recognition system can also be used as a shared resource through integration with a plurality of such non-wireline communications networks.

Referring now to FIG. 1, an exemplary telephone network is a cellular network 10 having a mobile telephone exchange (MTX) switch 12 connected to transceivers/antennas 14, 14'. Transceivers 14, 14' are located in each cell of the cellular network and communicate with the MTX to effect transmission and reception of signals to and from the mobile telephone located in vehicle 15. Each transceiver 14, 14' is typically connected to the MTX via a leased or dedicated network line 11, 11'. The MTX 12 is typically connected to the land-based destinations via telephone network.

A cellular mobile telecommunications system connects mobile telecommunications customers, each having a mobile unit to one another and to land-based customers served by a telephone network. Incoming and outgoing calls are routed through an MTX Switch 12 connected to a group of cell sites that communicate with mobile units. The MTX Switch 12 routes the calls between the mobile units and the telephone network. In a typical mobile cellular communications system, there are usually many cells per MTX Switch 12 and several MTX switches per system. As used herein, "mobile telecommunications system" refers to all of cellular, satellite and personal communications network environments.

Each cellular telephone is uniquely identified by two numbers: a serial number ("ESN") encoded in the phone by its manufacturer, and a mobile identification number ("MIN"), which is the cellular telephone number programmed in by the cellular service provider. The service provider operates the MTX Switch 12 and keeps a database of all MINs (and optionally their associated ESNs). Each time a call is placed by the cellular telephone, the service provider verifies whether the MIN is authorized. If the MIN of a cellular phone is not recognized, and the area code or provider designation of the MIN indicates that the phone number is outside of the provider's service area, the provider should prevent the caller from utilizing the data acquisition and error correcting speech recognition system. If the MIN indicates the caller is from within the provider's service area, but simply has not subscribed to voice dialing services, the caller may be offered the opportunity to subscribe to these services.

According to one embodiment of the invention as shown in FIG. 1, a data acquisition and error correcting speech recognition system 20, 20' is connected as an external peripheral to the MTX Switch 12 through a set of preferably digital trunk lines 22, 24. In the illustrated embodiment, an optional programmable switch 30 is shown which adds greater flexibility but also increases the set up and processing times and the cost of the system. The MTX Switch 12 or programmable switch 30 may also be able to access remote error correcting speech recognition systems 21 for customers who have traveled to an MTX switch location beyond their home calling area. Alternatively, the error correcting speech recognition system 20 may be able to contact subscriber database information 23 of remote location 21 via wide area network communications.

Trunk line set 22 is used for incoming signals to the data acquisition and error correcting speech recognition system 20 from MTX Switch 12 and trunk line set 24 is used for outgoing signals. As shown in FIG. 1 the speech recognition system 20 is connected to a dedicated data storage subsystem 25 through a data network 28. The data storage subsystem 25 is used to store subscriber recognition and calling data 26, 26' as will be described. The speech recognition system 20 may be integrated with more than one switch (whether or not cellular) for use as a shared resource via incoming and outgoing trunk sets connecting with local area network 28.

Network 28 will typically also be connected with additional resources which provide network management information 32, communications to the service provider's customer billing information 33, security and administrative information 27, statistical database information 29, and statistics processing 34.

Figure 2:
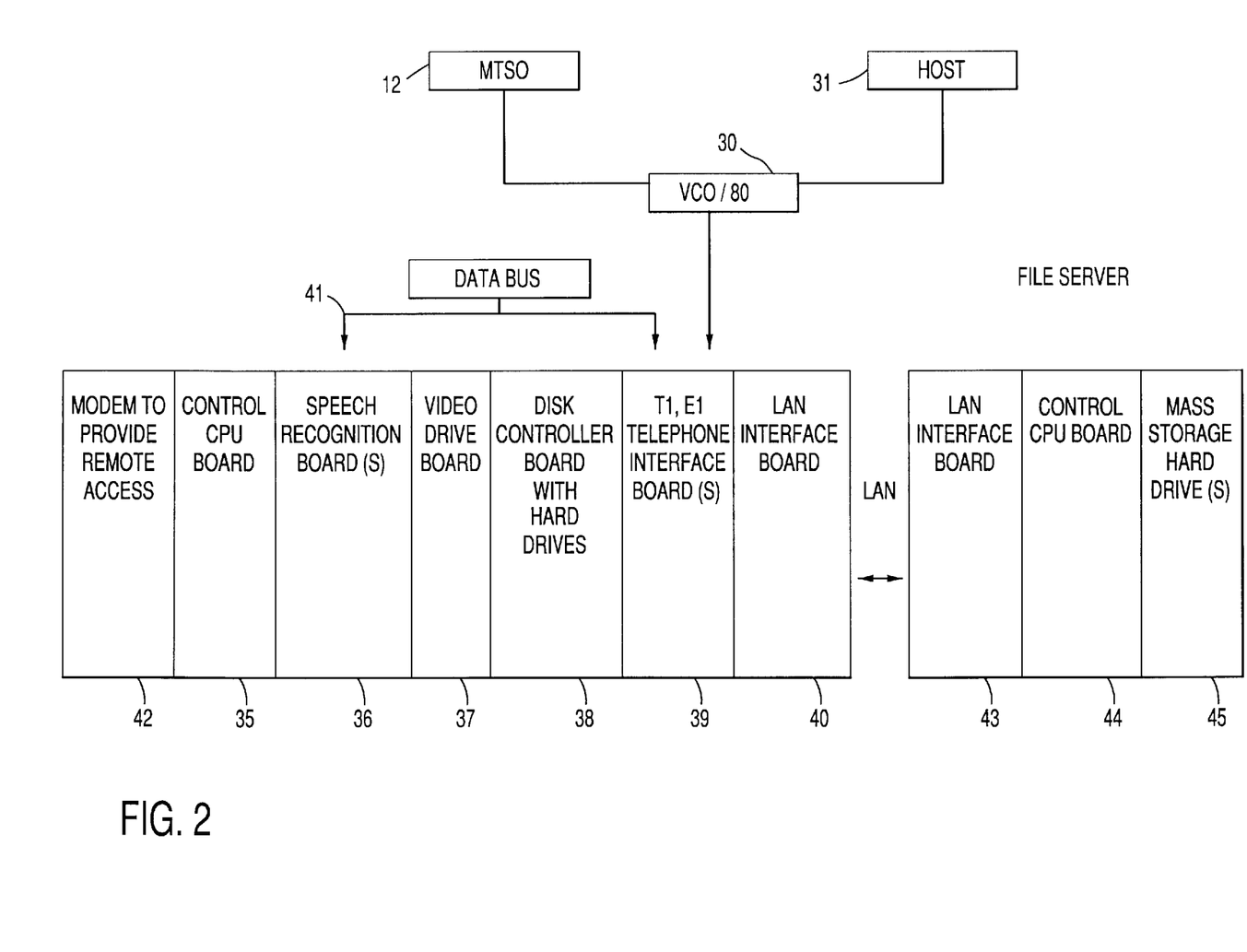
FIG. 2 is a block diagram representation of an implementation of an external switch-based error correcting speech recognition system according to the present invention.

FIG. 2 is an upper level block diagram of the error correcting speech recognition system 20 of FIG. 1. The system 20 generally consists of a central processing unit ("CPU") 35, a speech recognition board 36, such as the VPRO 88 sold by Voice Processing Corporation, video board 37, a disk drive controller with associated hard disk drive(s) 38, telephone interface boards 39, and local area network ("LAN") interface board(s) 40. A data bus such as pulse code modulation ("PCM") bus 41 also connects the telephone interface boards 39 directly to the speech recognition board(s) 36. A single CPU 35 can typically manage eight speech recognition boards 36. Ideally, a modem 42 is also provided to allow remote access to the system for problem diagnostics and software updates.

The CPU 35 and associated control programs function as the administrative and call processing subsystems, the speech recognition board 36 and associated programs carry out the speaker-dependent and speaker-independent recognition subsystem functions, while the hard disk controller and drives 38, together with server 25 and databases 26, 27, 29 on hard drives 45 comprise the data storage subsystem.

Figure 3:
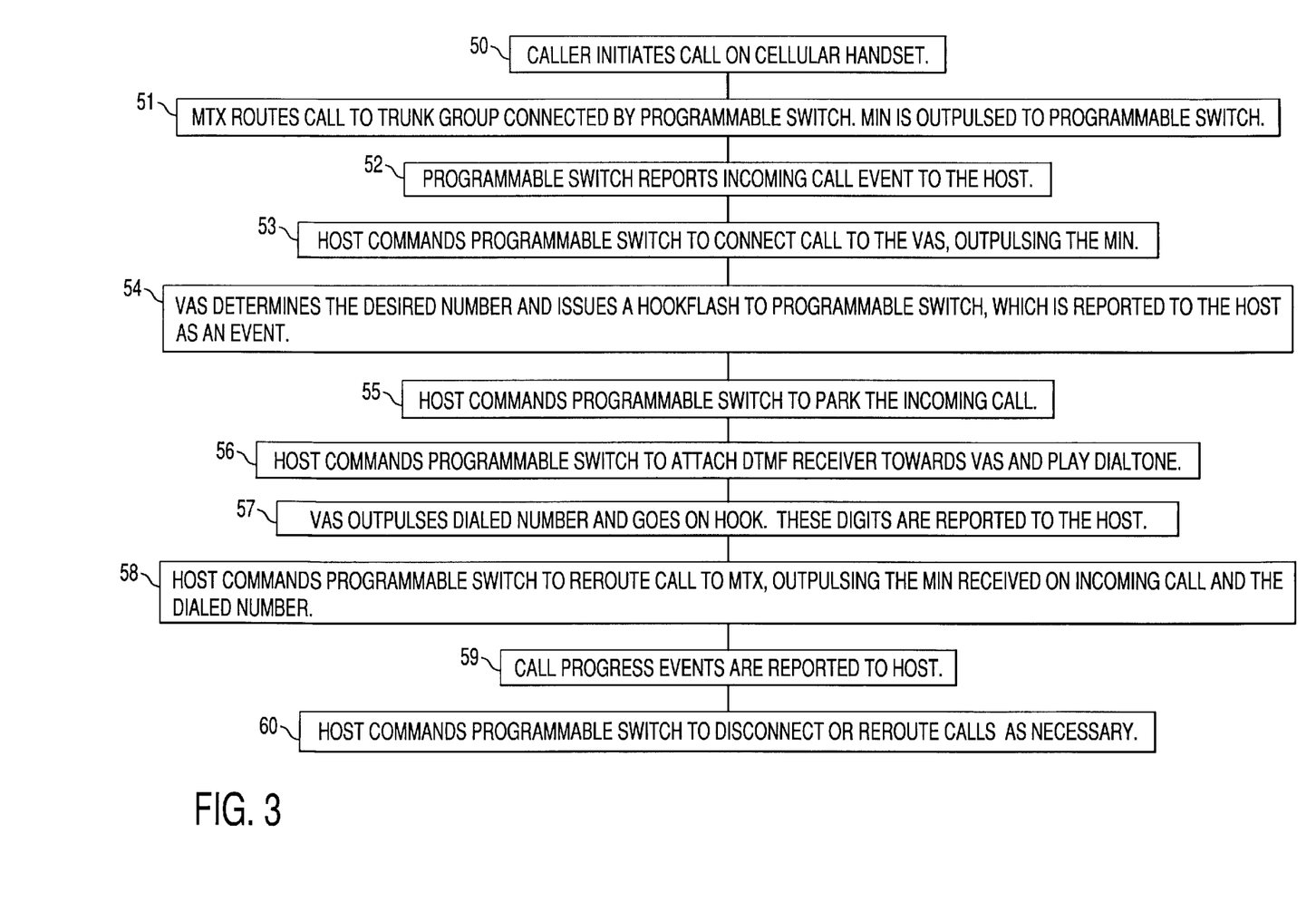
FIG. 3 is a flow chart of the progress of a call processed by an external switch-based error correcting speech recognition system according to the present invention.

FIG. 3 is a high level flow chart showing the progress of a typical call in a system with an optional programmable switch 30 (shown in FIG. 1). The call is initiated by a cellular customer in the first step 50. The MTX Switch 12 receives the call and routes it to a trunk line 22 in communication with the programmable switch 30 and outpulses the caller's MIN to the programmable switch 30 in the second step 51. The MIN is reported to the host 31 of the programmable switch 30 which recognizes the call requires speech recognition in the third step 52. The host 31 then directs the programmable switch 30 to connect the call to the data acquisition and error correcting speech recognition system ("VAS") 20 and out pulses the MIN to the VAS 20 in the fourth step 53. The VAS system 20 then determines the appropriate seven or ten digit number desired by the cellular customer and sends a command through the programmable switch 30 to the host 31 to obtain an outgoing line in the fifth step 54. The host 31 then directs the programmable switch 30 to park the cellular customer's call in step six 55. In the seventh step 56 the host directs the programmable switch 30 to attach a DTMF receiver towards the VAS 20 and to play a dial tone. Then the VAS 20 out pulses the requested number and hangs up while the digits are reported to the host 31 in the eighth step 57. The host 31 then directs the programmable switch 30 to re-route the line to the MTX Switch 12 outpulsing the MIN and the dialed number and thereby connecting the dialed number with the cellular customer in step nine 58. The call progress events are monitored and reported to the host 31 in step ten 59. The call is disconnected or rerouted as necessary by the host 31 issuing directions to the programmable switch 30 in the final step 60.

Step 54 where the VAS 20 determines the number desired by the customer is of the most significant interest. When the call is directed to the data acquisition and error correcting speech recognition system 20 it is accompanied by the caller's MIN. The VAS 20 searches administrative records for the MIN to see if the caller is an existing customer. Additional information such as personal identification numbers (PINs) and the like may also be transmitted to the VAS 20. New callers are introduced to the error correcting speech recognition service and offered the opportunity to subscribe to the service while existing customers' data records are accessed.

Figure 4:
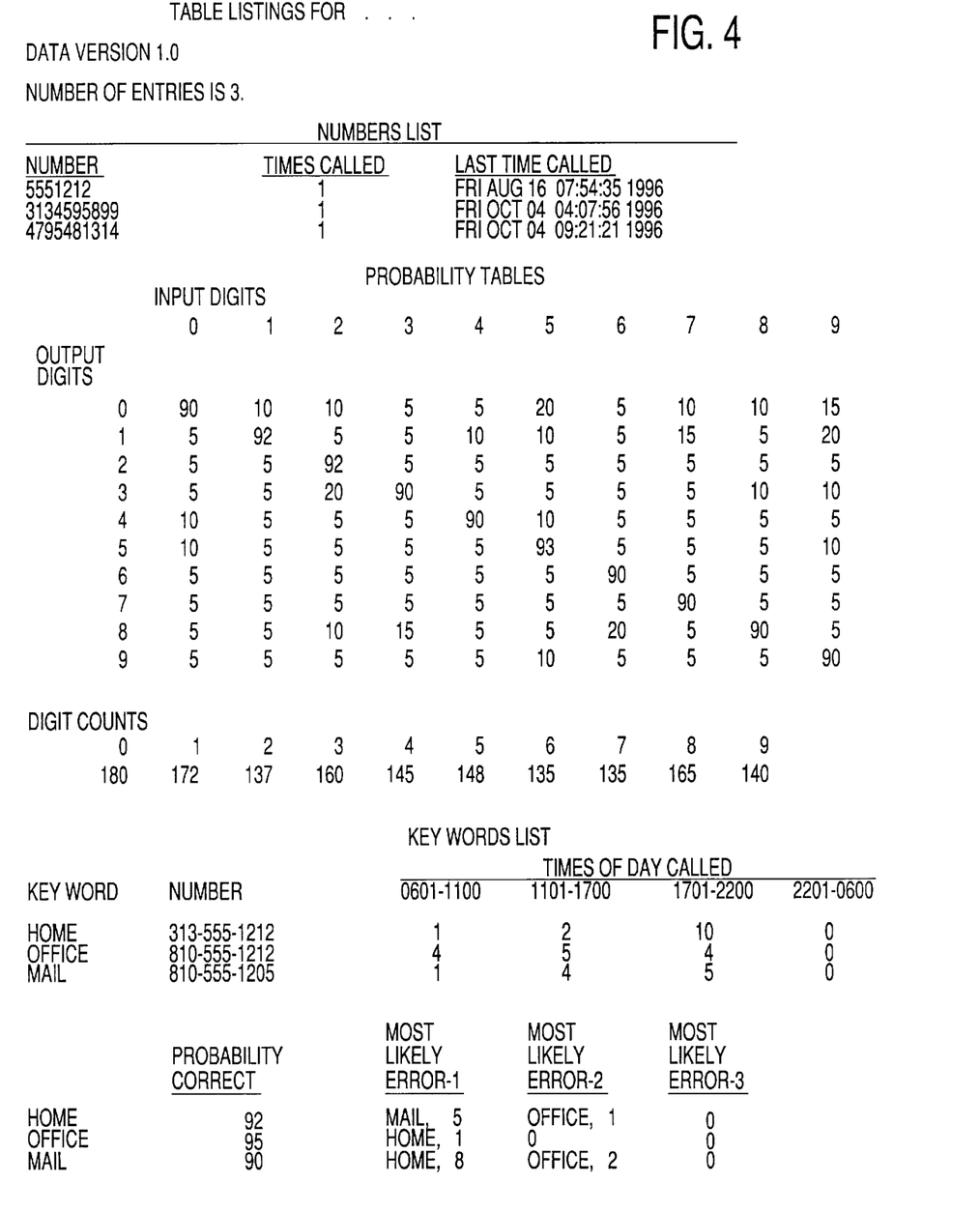
FIG. 4 is a representation of an exemplary user or customer record utilized by the error correcting speech recognition system of the present invention.

As in typical voice activated calling systems, the customer is allowed to associate certain telephone numbers with key words, and speech samples representing the key words together with the associated numbers are stored in each customer record. For error correction purposes, however, customer records also include a significant amount of additional information. A typical customer record is shown in FIG. 4. For instance, the customer record includes a list of phone numbers recently called by the customer and the frequency that those numbers were called. Typically, the last 20 different numbers would be stored with a number indicating the relative frequency with which it has been called.

In addition, the customer record stores a ten by ten matrix representative of the frequencies with which each digit has been properly recognized or misunderstood for another number. For key word calling, the customer's calling history for each key word is stored in a record indicating how frequently the customer has called a particular key word in each of four daily time periods in the previous weeks. In addition, information is kept on the speech recognizer's performance in accurately recognizing each key word, as well as the three alternative key words for which it has been most commonly misunderstood.

The error correcting speech recognition system addresses error correction as a linkage problem, utilizing sophisticated algorithms. In the case where the customer is calling a number, the speech recognizer returns a seven (local) or ten (long distance) digit number. The error correction system then analyzes the number returned by the speech recognizer to determine whether the recognized number is likely to be the real number spoken (or intended) by the customer. Information used in this analysis includes data on how phone numbers are distributed. For instance most area codes in the U.S. and Canada have middle digits of 0 or 1, so the likelihood of the middle digit of an area code being 0 is greater than the 10% probability that would be the case if area code numbers were completely random.

Figure 5A:
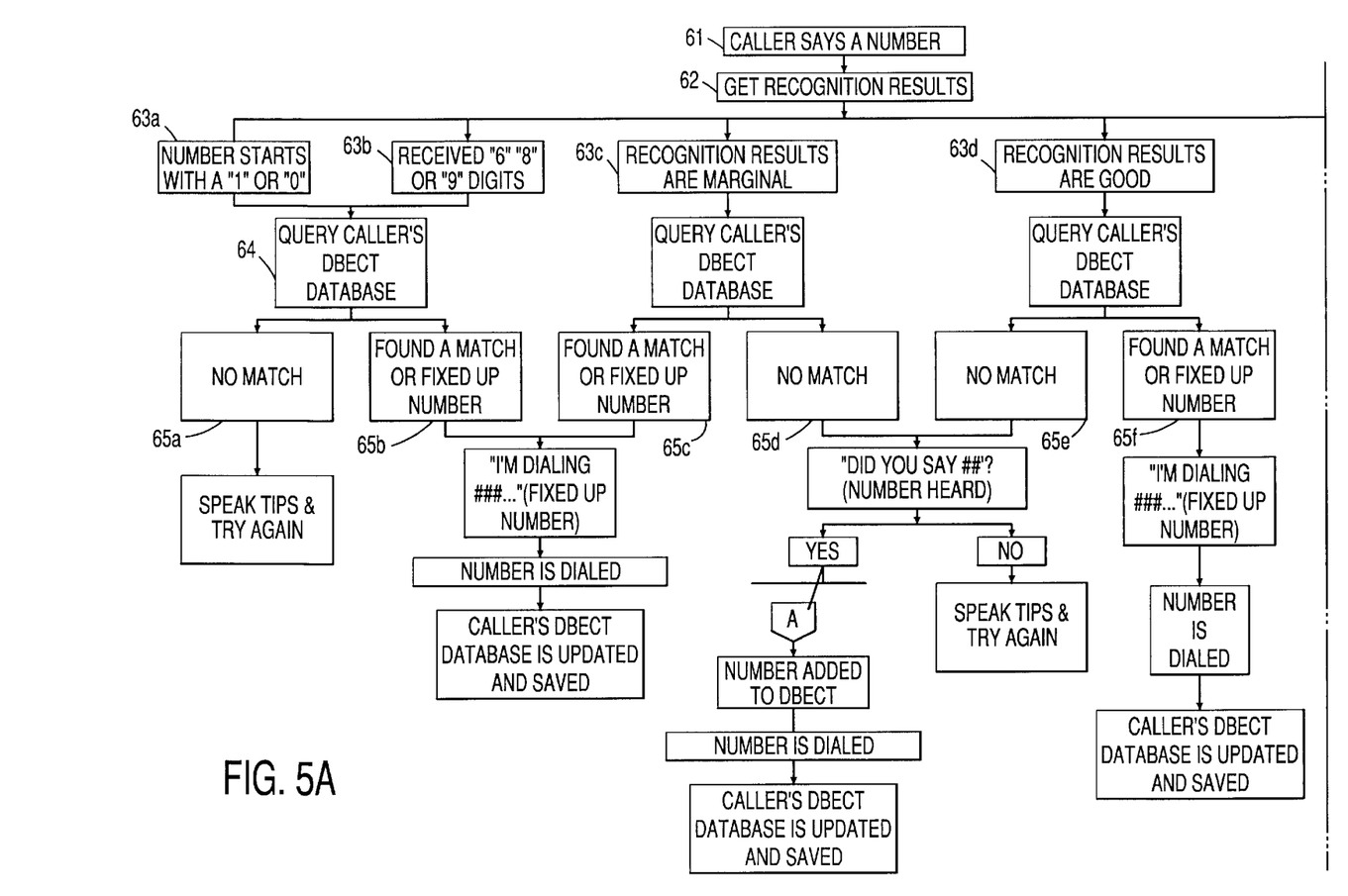
FIGS. 5A and 5B is a flow chart of the interaction of the error correcting speech recognition system with the system user.
Figure 5B:
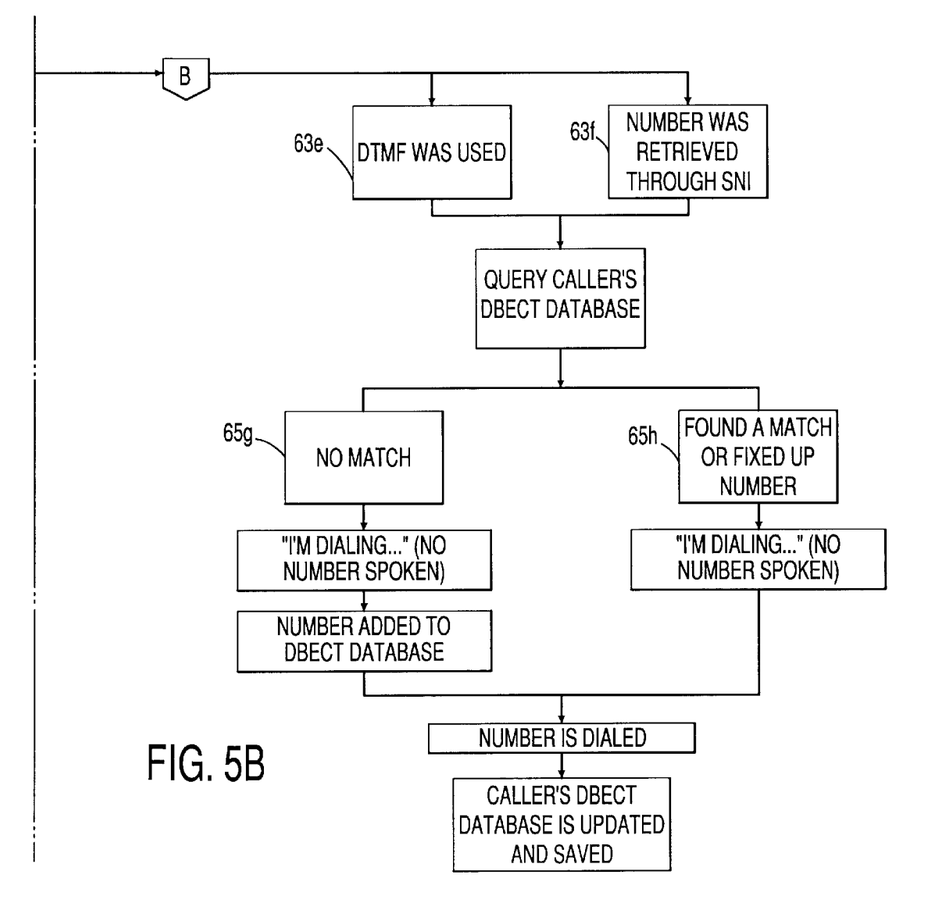
Figure 6:
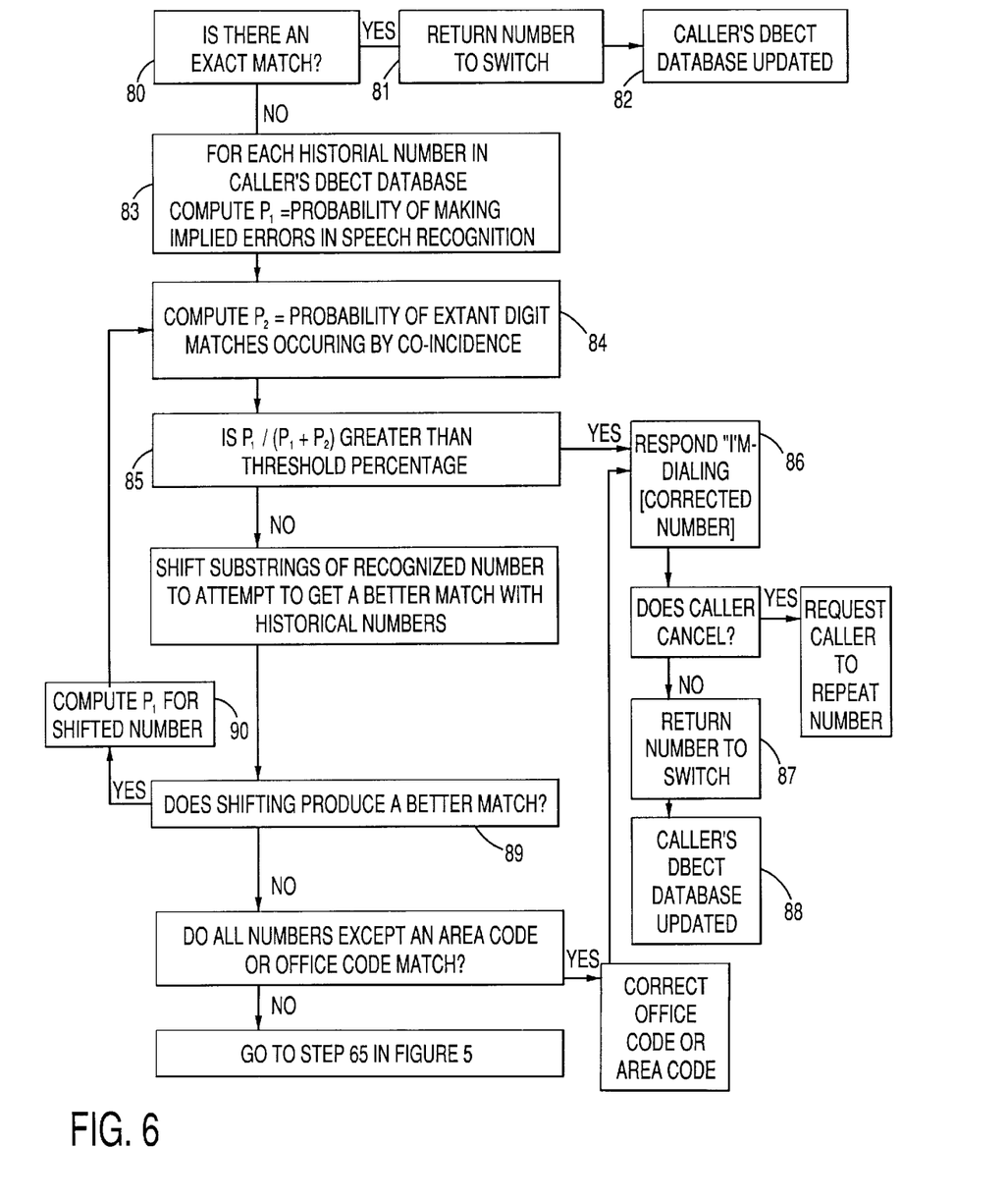
FIG. 6 is a more detailed flow chart of an exemplary algorithm of error correction in a speech recognition system according to the present invention.

FIGS. 5A, 5B, and 6 show the processing of spoken phone numbers. The first steps in the process are when the customer says a number 61 and speech recognizer passes a number 62 to the error correcting subsystem. For the purposes of illustration, we will assume a ten digit number consisting of a three digit area code, a three digit local office code, and a four digit ending is sent to error correction. As shown in FIG. 6, the error correcting subsystem then compares this number to the customer's data record for an exact match with recently called numbers 80. If there is an exact match, that number is accepted and returned by the system for out pulsing 81. In addition, the matrix representing the frequency of correct number recognition is updated to reflect that each number was correctly recognized 82.

The more interesting case is when there is not an exact match. In this case, the error correcting subsystem determines the relative likelihood that the number recognized was intended to be a slightly different number already in the customer's historical calling information. If that likelihood exceeds a predetermined level, say 70%, the customer will be asked if he meant to dial the corrected number. If the customer affirms, that corrected number will be dialed and the recognition matrix updated accordingly.

If an exact match is not found, the technique of the invention, referred to as the Dahlke-Bayes technique, performs several error correcting operations. In the presently preferred embodiment, these operations comprise digit substitution, phase shifting, and area code/office code matching. In the digit substitution scenario, the digit string is analyzed to determine the feasibility of accurately predicting and correcting speech-recognized digits, based upon previous calls made by the customer and probable digit substitutions from the recognition matrix.

The second operation is designed to identify potential matches through phase shift analysis of each digit within the number. For instance, a horn or other loud noise might sound while the customer is voice dialing a ten-digit number and that extraneous sound could be recognized as a number, thereby shifting all of the remaining digits yet to be spoken by the customer one digit to the right. The final digit of the phone number would likely be cut off and not recognized. To detect this type of problem, the analysis involves deleting a recognized digit and shifting the remaining digit stream to the left one position to see if there are a greater number of matches. Similarly, if the speech recognizer returns too few digits, phase shifting process will shift portions of the digit stream to the right one position to see if there is a likely phase shift by determining whether more numeric positions in the number match positions of a number from the caller's historical record.

The third preferred technique involves area code and office code matching. Because most customers utilize phone numbers in no more than three area codes, and no more than 20 office codes, misrecognized digits in these portions of the phone number can often be corrected.

The process may be demonstrated with hypothetical example of a customer whose historical record includes only two numbers:

$X_1$=313 459 5899
$X_2$=479 548 1314

The ten digit number sent to the error correcting subsystem is Z=303 458 5889. The initial loop through the customer's historical call information does not provide an exact match, so the system determines the probability that Z is a number already in the customer's historical record versus the probability that it is a new number.

First in comparing Z to $X_1$. The probability that first digit 3 would be correctly recognized $P_{3/3}$=0.9 and this is multiplied by the probability that the second digit 1 would be misrecognized as a 0 or $P_{1/0}$=0.1 and by the probability that the third digit 3 would be correctly recognized $P_{3/3}$=0.9. This process is repeated for digits 4–10 as follows:

$P_{4/4} = .9$ $P_{5/5} = .93$ $P_{9/8} = .05$ $P_{5/5} = .93$ $P_{8/8} = .9$ $P_{9/8} = .05$ $P_{3/9} = .9$

Multiplying all probabilities: (0.9)(0.1)(0.9)(0.9)(0.93)(0.05)(0.93)(0.9)(0.05)(0.9) which produces a result on the order of $1.3 \times 10^{-4}$. Z is then compared to $X_2$ but since only one digit matches, the chance that the number has been misrecognized is less than about $1.0 \times 10^{-9}$. Accordingly, the maximum $P_1$ is obtained for possibility $X_1$. Next, the chance of a random number matching as many digits of $X_1$ is computed. Random distribution of numbers according to the binomial theorem would indicate the chances of the seven extant digit matches between $X_1$ and Z simply by coincidence would be $1 \times 10^{-7}$. Thus the probability that Z is a number already in the customer's historical record $p_1=1.3\times10^{-4}$ and the probability that it is a new number is $1\times10^{-7}$. Since $p_1/(p_1+p_2)$ in this case is greater than the chosen threshold of 70%, the substitutions are made. As a result of the substitution, changes are made to the probability table as well. In practice, it is preferable to modify the probabilities somewhat to account for the fact that most people dial numbers predominately from only about three area codes, and only about twenty office codes. In addition, business phone numbers commonly end in "00". As a result of these modifications, the chances of extant digit matches simply by coincidence is more appropriately completed to be about $1.4\times10^{-5}$. Even with these modifications, the changes would be made in the illustrated example.

Turning now to FIGS. 5A and 5B, a flow chart is provided showing the various methods in which a number may be processed. When the call has been connected to the VAS 20, the caller either speaks or is queried for a number to be dialed 61. This information is received through the telephone interface board 39 of the VAS 20 and sent to a speech recognition board 36 for processing, and the speech recognition board returns a string of digits to the CPU 35 in the next step 62. In the meantime, the caller's historical calling data as exemplified by FIG. 4 has been called up from database server 25, and in the next step 63, six possibilities are contemplated:

63a the number returned starts with a '1' or '0' (invalid)

63b the number returned has 6, 8 or 9 digits (invalid)

63c recognition results are marginal, as reported by the speech recognition board 36

63d recognition results are good, as reported by the speech recognition board 36

63e the caller dialed using a touchpad rather than voice 63f the number was entered through segmented numerical input, which recognized a phone number in 3 and 4 digit segments. This routine is used when the system does not properly recognize a caller's attempts to speak 7 or 10 digit numbers.

In all cases, the caller's historical calling data is reviewed in the next step 64 and the error correcting algorithm is applied.

FIG. 6 provides a general schematic of the operation of the error correcting routine. In the first instance 80, the recognized number Z is compared to all of the caller's historical numbers to see if there is a match. If there is a match, that number is returned for dialing 81 and the customer's probability tables are updated to indicate that each digit was correctly recognized 82.

If there is no match, the routine computes the probability that errors in speech recognition were made resulting in each historically dialed number being mis-recognized as number Z, assigning this value the designation $p_1$, 83. Then the probability of extant digit matches with Z simply by coincidence is computed as $p_2$, 84. In the next step 85, if $p_1/(p_1+p_2)$ exceeds an assigned threshhold of about 70%, then the routine will suggest a change to the customer by stating "Dialing (historical number)" 86. If the customer fails to cancel, the historical number will be dialed 87, and the caller's probability tables updated to reflect the correct and incorrect recognition of digits in the number 88.

If $P_1/(P_1+P_2)$ does not exceed the threshhold, the routine will attempt to obtain a better match by phase shifting 99. If shifting substrings of Z produces a better match with any of the caller's historical numbers, a new $p_1$ will be computed 90 and $p_1/(p_1+p_2)$ reexamined to see if the threshhold is now exceeded. If neither phase shifting nor digit substitution have been employed, the routine proceeds to attempt to fix the number Z by merely substituting office codes or area codes. If such a substitution produces an exact match, the customer is again advised that a corrected number is to be dialed. If the customer does not CANCEL, then the number is dialed and the customer's probability table is updated.

It should be noted that the preferred algorithm weighs more heavily numbers that the customer has dialed frequently.

In addition, after error correction, the returned number must still adhere to certain rules. For instance, it must have seven or ten numbers and must not begin with 0 or 1. If the returned number violates such a rule, the customer will be asked to try again. Finally, the system should not alter universal numbers so that for instance New York City long distance information, 212-555-1212, will not be corrected to Detroit long distance information, 313-555-1212, even if the latter number is in the caller's historical records.

In each case, after a number is recognized and accepted by the customer, the customer's data records are updated. This includes the probability tables for number recognition, the most recently and most frequently called numbers, most frequently called area codes and office codes, and even times of day that particular numbers are called.

While several embodiments of the present invention have been disclosed, it is to be understood by those skilled in the art that other forms can be adopted, all coming within the spirit of the invention and scope of the appended claims.

What is claimed is:

1. An error correcting voice recognition system in a mobile telecommunications system connecting mobile customers by destination numbers to other customers served by a telephone network, each mobile customer having a mobile telecommunications unit, the incoming and outgoing calls routed through a mobile telecommunications switch connected to a plurality of cell sites that communicate with the mobile telecommunication units, said error correcting voice recognition system being connected to the mobile telecommunications switch and comprising:

a speech recognizer for recognizing numbers and words spoken by a mobile customer to determine a recognized number or word;

a processor coupled to the speech recognizer, the processor operative under the control of a program containing an error correcting algorithm;

a data storage subsystem coupled to the processor, the data storage subsystem containing historical calling information for the mobile customer;

said processor further operative under said program to execute the error correcting algorithm upon the recognized number or word provided by the speech recognizer and the historical calling information of the mobile customer provided by the data storage subsystem, and responsive thereto to transfer an error corrected destination number to be dialed to the telephone network.

2. The error correcting voice recognition system of claim 1 wherein the historical calling information comprises a plurality of phone numbers previously called by the mobile customer.

3. The error correcting voice recognition system of claim 1 wherein the historical calling information comprises data representative of the relative frequency with which phone numbers have been recently called by the mobile customer.

4. The error correcting voice recognition system of claim 3 wherein the historical calling information further comprises data representative of the relative frequency with which phone numbers are called by the mobile customer at various times of day.

5. The error correcting voice recognition system of claim 1 wherein the error correcting algorithm comprises a corrective digit substitution operation.

6. The error correcting voice recognition system of claim 1 wherein the error correcting algorithm comprises a corrective phase shift analysis operation.

7. The error correcting voice recognition system of claim 1 wherein the error correcting algorithm comprises a corrective area code matching operation.

8. The error correcting voice recognition system of claim 1 wherein the error correcting algorithm comprises a corrective office code matching operation.

9. The error correcting voice recognition system of claim 2 wherein the error correcting algorithm determines the probability that the recognized number matches a phone number in the mobile customer's historical calling information.

10. The error correcting voice recognition system of claim 9 wherein the error correcting algorithm further determines the probability that the recognized number is a destination number not contained within the mobile customer's historical calling information.

11. An error correcting voice recognition system in a mobile telecommunications system connecting mobile customers by destination numbers to other customers served by a telephone network, each mobile customer having a mobile telecommunications unit, incoming and outgoing calls routed through a mobile telecommunications switch connected to a plurality of cell sites that communicate with the mobile telecommunication units, said error correcting voice recognition system being connected to the mobile telecommunications switch and comprising:

- a speech recognizer for recognizing numbers and words spoken by a mobile customer to determine a recognized number or word;
- a processor coupled to the speech recognizer, the processor operative under the control of a program containing an error correcting algorithm;
- a data storage subsystem coupled to the processor, the data storage subsystem containing historical calling information for the mobile customer;
- said processor further operative under said program to execute the error correcting algorithm upon the recognized number or word provided by the speech recognizer and the historical calling information of the mobile customer provided by the data storage subsystem, and responsive thereto to transfer an error corrected destination number to be dialed to the telephone network;
- the historical calling information comprising speech recognition data representative of the frequency with which numeric digits have been erroneously recognized by the speech recognizer for another digit.

12. An error correcting voice recognition system in a mobile telecommunications system connecting mobile customers by destination numbers to other customers served by a telephone network, each mobile customer having a mobile telecommunications unit, incoming and outgoing calls routed through a mobile telecommunications switch connected to a plurality of cell sites that communicate with the mobile telecommunication units, said error correcting voice recognition system being connected to the mobile telecommunications switch and comprising:

- a speech recognizer for recognizing numbers and words spoken by a mobile customer to determine a recognized number or word;
- a processor coupled to the speech recognizer, the processor operative under the control of a program containing an error correcting algorithm;
- a data storage subsystem coupled to the processor, the data storage subsystem containing historical calling information for the mobile customer;
- said processor further operative under said program to execute the error correcting algorithm upon the recognized number or word provided by the speech recognizer and the historical calling information of the mobile customer provided by the data storage subsystem, and responsive thereto to transfer an error corrected destination number to be dialed to the telephone network;
- the historical calling information comprising speech recognition data representative of the frequency with which words have been erroneously recognized by the speech recognizer for another word.

13. A method for correcting errors in speech recognized dialing information for making a telephone call comprising the steps of:

(a) storing in a database historical calling information and historical speech recognition information for a user;

(b) speech recognizing user uttered dialing information;

(c) comparing said speech recognized dialing information with the user's historical calling information and if there is an exact match placing the telephone call indicated by the dialing information and updating the user's historical speech recognition information and historical calling information;

(d) in the event that the speech recognized dialing information does not exactly match any user historical calling information, determining a likelihood that the speech recognized dialing information is intended to match user historical calling information, and if said likelihood exceeds a predetermined level, tentatively correcting said dialing information;

(e) advising the user of the tentatively corrected dialing information;

(f) allowing the user to reject the corrected dialing information;

(g) if the user rejects the corrected dialing information, prompting the user to re-utter the dialing information and returning to step (b);

(h) otherwise, if the user does not reject the corrected dialing information, placing the telephone call indicated by the corrected dialing information and updating the user's historical speech recognition information and historical calling information.

14. The method of claim 13 wherein the historical calling information comprises phone numbers previously called by the user.

15. The method of claim 13 wherein the historical calling information comprises data representative of the relative frequency with which phone numbers have been recently called by the user.

16. The method of claim 15 wherein the historical calling information further comprises data representative of the relative frequency with which phone numbers are called by the user at various times of day.

17. A method for correcting errors in speech recognized dialing information for making a telephone call comprising the steps of:

(a) storing in a database historical calling information and historical speech recognition information for a user;

(b) speech recognizing user uttered dialing information;

(c) comparing said speech recognized dialing information with the user's historical calling information and if there is an exact match placing the telephone call indicated by the dialing information and updating the user's historical speech recognition information and historical calling information;

(d) in the event that the speech recognized dialing information does not exactly match any user historical calling information, determining a likelihood that the speech recognized dialing information is intended to match user historical calling information, and if said likelihood exceeds a predetermined level, tentatively correcting said dialing information;

(e) advising the user of the tentatively corrected dialing information;

(f) allowing the user to reject the corrected dialing information;

(g) if the user rejects the corrected dialing information, prompting the user to re-utter the dialing information and returning to step (b); and (h) otherwise, if the user does not reject the corrected dialing information, placing the telephone call indicated by the corrected dialing information and updating the user's historical speech recognition information and historical calling information;

the historical calling information comprising speech recognition data representative of the frequency with which numeric digits have been erroneously recognized by the speech recognizer for another digit.

18. A method for correcting errors in speech recognized dialing information for making a telephone call comprising the steps of:

(a) storing in a database historical calling information and historical speech recognition information for a user;

(b) speech recognizing user uttered dialing information;

(c) comparing said speech recognized dialing information with the user's historical calling information and if there is an exact match placing the telephone call indicated by the dialing information and updating the user's historical speech recognition information and historical calling information;

(d) in the event that the speech recognized dialing information does not exactly match any user historical calling information, determining a likelihood that the speech recognized dialing information is intended to match user historical calling information, and if said likelihood exceeds a predetermined level, tentatively correcting said dialing information;

(e) advising the user of the tentatively corrected dialing information;

(f) allowing the user to reject the corrected dialing information;

(g) if the user rejects the corrected dialing information, prompting the user to re-utter the dialing information and returning to step (b); and (h) otherwise, if the user does not reject the corrected dialing information, placing the telephone call indicated by the corrected dialing information and updating the user's historical speech recognition information and historical calling information;

the historical speech recognition information comprising data representative of the frequency with which numeric digits have been erroneously recognized in the speech recognizing step for another digit.

19. A method for correcting errors in speech recognized dialing information for making a telephone call comprising the steps of:

(a) storing in a database historical calling information and historical speech recognition information for a user;

(b) speech recognizing user uttered dialing information;

(c) comparing said speech recognized dialing information with the user's historical calling information and if there is an exact match placing the telephone call indicated by the dialing information and updating the user's historical speech recognition information and historical calling information;

(d) in the event that the speech recognized dialing information does not exactly match any user historical calling information, determining a likelihood that the speech recognized dialing information is intended to match user historical calling information, and if said likelihood exceeds a predetermined level, tentatively correcting said dialing information;

(e) advising the user of the tentatively corrected dialing information;

(f) allowing the user to reject the corrected dialing information;

(g) if the user rejects the corrected dialing information, prompting the user to re-utter the dialing information and returning to step (b); and (h) otherwise, if the user does not reject the corrected dialing information, placing the telephone call indicated by the corrected dialing information and updating the user's historical speech recognition information and historical calling information;

the historical speech recognition information comprising data representative of the frequency with which words have been erroneously recognized in the speech recognition step for another word.

20. A data acquisition voice recognition system in a mobile telecommunications system connecting mobile customers by destination number to other customers served by a telephone network, each mobile customer having a mobile telecommunications unit, incoming and outgoing calls routed through a mobile telecommunications switch connected to a plurality of cell sites that communicate with the mobile telecommunication units, said data acquisition voice recognition system being connected to the mobile telecommunications switch and comprising:

a speech recognizer for recognizing numbers spoken by a mobile customer;

a processor coupled to the speech recognizer, the processor operative under the control of a program containing a data acquisition algorithm;

a data storage subsystem coupled to the processor, the data storage subsystem containing historical calling information for the mobile customer;

said processor further operative under said program containing the data acquisition algorithm to update the historical calling information for the mobile customer after recognizing a destination number spoken by the mobile customer, the processor operative under the control of a program containing an error correcting algorithm to correct the destination number spoken by the mobile customer based on the historical calling information.

21. The data acquisition voice recognition system of claim 20 wherein the historical calling information comprises phone numbers previously called by the mobile customer.

22. The data acquisition voice recognition system of claim 20 wherein the historical calling information comprises data representative of the relative frequency with which phone numbers have been recently called by the mobile customer.

23. The data acquisition voice recognition system of claim 22 wherein the historical calling information further comprises data representative of the relative frequency with which phone numbers are called by the mobile customer at various times of day.

24. The data acquisition voice recognition system of claim 20 wherein the historical calling information comprises at least one area code frequently called by the mobile customer.

25. The data acquisition voice recognition system of claim 20 wherein the historical calling information comprises at least four office codes frequently called by the mobile customer.

26. An error correcting voice recognition system comprising:

a data storage subsystem having error correction data including data representative of telephone number distribution characteristics in a telephone numbering area in which the system is configured for deployment, and historical calling data representative of a telephone number calling history;

a speech recognizer operable for receiving an audible telephone number from the user and generating a speech data based on the audible telephone number; and a processor coupled to the speech recognizer and the data storage subsystem, the processor generating a corrected telephone number based on the error correction data.

27. An error correcting voice recognition system as claimed in claim 26, wherein the processor is operable to issue an audible prompt to confirm whether the corrected telephone number is a telephone number to be called.

* * * * *